United States Patent
Maggu et al.

(10) Patent No.: US 12,508,186 B2
(45) Date of Patent: Dec. 30, 2025

(54) MOBILE WEIGHT-BEARING POWERED ORTHOSIS DEVICE

(71) Applicant: Trexo Robotics Inc., Mississauga (CA)

(72) Inventors: Manmeet Singh Maggu, Mississauga (CA); Rahul Udasi, Mississauga (CA)

(73) Assignee: Trexo Robotics Inc., Mississauga (CA)

( * ) Notice: Subject to any disclaimer, the term of this patent is extended or adjusted under 35 U.S.C. 154(b) by 0 days.

(21) Appl. No.: 16/331,950

(22) PCT Filed: Sep. 7, 2017

(86) PCT No.: PCT/CA2017/051047
§ 371 (c)(1),
(2) Date: Mar. 8, 2019

(87) PCT Pub. No.: WO2018/045460
PCT Pub. Date: Mar. 15, 2018

(65) Prior Publication Data
US 2019/0216674 A1    Jul. 18, 2019

Related U.S. Application Data

(60) Provisional application No. 62/384,871, filed on Sep. 8, 2016.

(51) Int. Cl.
*A61H 3/00* (2006.01)
*A61B 5/11* (2006.01)
(Continued)

(52) U.S. Cl.
CPC ............. *A61H 3/008* (2013.01); *A61B 5/112* (2013.01); *A61H 1/024* (2013.01); *A61H 1/0244* (2013.01);
(Continued)

(58) Field of Classification Search
CPC .......... A61H 3/008; A61H 3/04; A61H 1/024; A61H 1/0262; A61H 1/0244;
(Continued)

(56) References Cited

U.S. PATENT DOCUMENTS

| | | | |
|---|---|---|---|
| 219,439 A | * | 9/1879 | Blend ................ A63B 69/0064 601/23 |
| 2,210,269 A | | 8/1940 | Taylor |

(Continued)

FOREIGN PATENT DOCUMENTS

| | | |
|---|---|---|
| CN | 101791255 A | 8/2010 |
| CN | 203749802 U | 8/2014 |

(Continued)

OTHER PUBLICATIONS

Extended European Search Report in European Application No. 17847848.3, mailed Apr. 6, 2020.
(Continued)

*Primary Examiner* — Tu A Vo
*Assistant Examiner* — Kelsey E Baller
(74) *Attorney, Agent, or Firm* — Cognition IP, P.C.; Edward Steakley

(57) ABSTRACT

A mobile, modular and adjustable system for rehabilitation and/or mobility. The system includes an outer frame and wheels. A pelvis support can be used for distributing weight of the user to the frame. A lower body attachment is movably attached to the outer frame. At least one motorized unit may also be provided, which includes at least one actuator to assist movement of the user's hip and/or leg through the lower body attachment. A local and/or cloud-based artificial intelligence system can be used for controlling the function of the mobile system.

18 Claims, 8 Drawing Sheets

(51) Int. Cl.

| | | |
|---|---|---|
| *A61H 1/02* | (2006.01) | |
| *A61H 3/04* | (2006.01) | |
| *G16H 20/30* | (2018.01) | |
| *G16H 40/63* | (2018.01) | |
| *G16H 50/20* | (2018.01) | |
| *G16H 50/30* | (2018.01) | |
| *G16H 50/70* | (2018.01) | |

(52) U.S. Cl.
CPC .............. *A61H 1/0262* (2013.01); *A61H 3/04* (2013.01); *G16H 20/30* (2018.01); *G16H 50/20* (2018.01); *A61H 2003/006* (2013.01); *A61H 2003/007* (2013.01); *A61H 2003/043* (2013.01); *A61H 2201/0157* (2013.01); *A61H 2201/0192* (2013.01); *A61H 2201/1207* (2013.01); *A61H 2201/1215* (2013.01); *A61H 2201/163* (2013.01); *A61H 2201/164* (2013.01); *A61H 2201/1642* (2013.01); *A61H 2201/1652* (2013.01); *A61H 2201/5012* (2013.01); *A61H 2201/5043* (2013.01); *A61H 2201/5046* (2013.01); *A61H 2201/5058* (2013.01); *G16H 40/63* (2018.01); *G16H 50/30* (2018.01); *G16H 50/70* (2018.01)

(58) Field of Classification Search
CPC ........ A61H 2003/006; A61H 2003/043; A61H 2201/0157; A61H 2201/0192; A61H 2201/163; A61H 2201/1642; A61H 2201/5058; A61H 2201/1652; A61H 2201/164; G16H 20/30; G16H 50/30; A61B 5/112; A61B 5/00
USPC ............................................................ 601/5
See application file for complete search history.

(56) References Cited

U.S. PATENT DOCUMENTS

| | | | | |
|---|---|---|---|---|
| 2,719,568 A | * | 10/1955 | Webb | A61H 3/008 482/68 |
| 2,792,052 A | * | 5/1957 | Johannesen | A61G 7/1051 297/5 |
| 2,989,114 A | * | 6/1961 | Ecroyd | A61H 3/00 135/84 |
| 3,999,228 A | * | 12/1976 | Thomas | A61G 7/1015 5/83.1 |
| 5,152,730 A | * | 10/1992 | Hoffman | A61H 3/008 135/67 |
| 5,467,793 A | * | 11/1995 | Hart | A61H 3/04 135/67 |
| 6,343,802 B1 | * | 2/2002 | Workman | A61H 3/008 135/67 |
| 6,666,831 B1 | * | 12/2003 | Edgerton | A61H 1/0237 600/587 |
| 6,679,510 B2 | * | 1/2004 | Perena | A61G 5/14 280/250.1 |
| 6,754,560 B2 | * | 6/2004 | Fujita | B25J 13/003 318/568.12 |
| 7,153,242 B2 | | 12/2006 | Goffer | |
| 7,628,766 B1 | * | 12/2009 | Kazerooni | A61F 5/00 601/5 |
| 8,627,909 B2 | * | 1/2014 | Chang | A61H 3/04 180/19.2 |
| 9,642,763 B2 | * | 5/2017 | Olsen | A63B 21/00178 |
| 9,789,023 B1 | * | 10/2017 | Lee | A63B 24/0021 |
| 2004/0143198 A1 | * | 7/2004 | West | A61F 5/0102 601/5 |
| 2005/0101448 A1 | * | 5/2005 | He | A63B 22/02 482/54 |
| 2009/0224499 A1 | * | 9/2009 | Dashew | A61H 3/04 280/87.05 |
| 2011/0066088 A1 | | 3/2011 | Little et al. | |
| 2013/0137553 A1 | * | 5/2013 | Kim | A61H 1/0266 482/69 |
| 2014/0213951 A1 | * | 7/2014 | Pietrusisnki | A61H 3/008 602/23 |
| 2015/0238382 A1 | * | 8/2015 | Park | A61H 1/0244 623/27 |
| 2016/0074272 A1 | * | 3/2016 | Ahn | A61B 5/1123 623/24 |
| 2016/0136477 A1 | * | 5/2016 | Bucher | A63B 24/0062 482/4 |
| 2016/0331560 A1 | * | 11/2016 | Tong | A61H 1/024 |
| 2019/0167507 A1 | * | 6/2019 | Mckay | A61H 1/0229 |
| 2019/0290209 A1 | * | 9/2019 | Fu | A61B 5/6828 |
| 2021/0322248 A1 | * | 10/2021 | Puchades | A61B 5/1121 |
| 2021/0393467 A1 | * | 12/2021 | Ookoba | B25J 9/163 |

FOREIGN PATENT DOCUMENTS

| | | | | |
|---|---|---|---|---|
| CN | 105105986 A | | 12/2015 | |
| CN | 105726272 A | | 7/2016 | |
| CN | 106491312 A | * | 3/2017 | .............. A61H 3/00 |
| EP | 2 671 559 A1 | | 12/2013 | |
| FR | 2 868 293 A1 | | 10/2005 | |
| GB | 2 484 463 A | | 4/2012 | |
| JP | 2005205001 A | | 8/2005 | |
| JP | 2014128724 A | | 7/2014 | |
| KR | 20100044358 A | | 4/2010 | |
| KR | 20100044359 A | * | 4/2010 | .............. A61H 3/04 |
| KR | 101221046 B1 | | 2/2013 | |
| TW | 201628677 A | * | 8/2016 | |
| WO | WO-2008096210 A1 | * | 8/2008 | .............. A61H 3/04 |
| WO | 2014/001853 A1 | | 1/2014 | |
| WO | 2014065493 A1 | | 5/2014 | |

OTHER PUBLICATIONS

Kong et al., Design and Control of an Exoskeleton for the Elderly and Patients; IEEE/ASME Transactions on Mechatronics, vol. 11, No. 4, Aug. 2006; pp. 428-432.

International Search Report & Written Opinion for International Application No. PCT/CA2017/051047, mailed Dec. 18, 2017; 11 pages.

* cited by examiner

MOBILE WEIGHT-BEARING POWERED ORTHOSIS DEVICE

CROSS-REFERENCE TO RELATED APPLICATIONS

This application is a national stage of PCT application PCT/CA2017/051047 entitled MOBILE WEIGHT-BEARING POWERED ORTHOSIS DEVICE, filed Sep. 7, 2017, which claims the benefit of priority to U.S. Provisional Patent Application No. 62/384,871, filed Sep. 8, 2016, entitled MOBILE WEIGHT-BEARING POWERED ORTHOSIS DEVICE, which is/are all hereby incorporated by reference in their entirety.

FIELD

Example embodiments relate to the field of robotic rehabilitation and/or mobility, in particular robotic gait training, mobility, control systems for real time control and artificial intelligence systems for long term planning.

BACKGROUND

Cerebral palsy is a neurological disability caused by an injury to the brain, usually as a stroke, before, during, or shortly after birth. In many cases it can affect a child's ability to walk. It is the most common physical disability among children, with over 500,000 children suffering from cerebral palsy in North America, and 10,000 babies born each year with cerebral palsy.

Physiotherapy is a commonly used method to help the affected children to regain at least some ability to walk. It is also commonly used to help users who lost some or all ability to walk for other reasons, for example, injury.

Currently, physiotherapy is an expensive and difficult process. It requires a lot of effort on the part of the physiotherapist, as it involves physically helping a user move his or her legs in a particular manner. Moreover, regular physiotherapy can be expensive.

Robotic gait training is a field that has shown a lot of promise towards helping improve a user's balance, posture and overall gait. The current solutions are some versions of the Lokomat™, ReoAmbulator™, and Bama Teknoloji devices, shown in FIGS. 1A and 1B. These systems are bulky, treadmill-style machines with a high cost of production. In addition, these systems are stationary, meaning that the user can only be treated in the facilities where the systems are installed.

Additional difficulties with existing systems may be appreciated in view of the Detailed Description of Example Embodiments, herein below.

SUMMARY

According to one aspect, a mobile system with a software system for control is disclosed for providing physiotherapy and mobility to users to improve their ability to walk.

An example embodiment includes a system for rehabilitation and/or mobility of a user, comprising: a frame; wheels for enabling rolling movement of the frame; a pelvis support for distributing weight of the user to the frame; and a motorized unit operably attached to the frame and for assisting movement of the user; wherein the motorized unit comprises an attachment for attaching to a part of a lower body of the user.

In some embodiments, the mobile system comprises a main frame, a frame for attaching harness and a harness that may fully or partially suspend the user. The user may choose not to be suspended at all. In some embodiments, multiple attachment points may be provided for attachment of a harness or pelvis support, which bears the full or partial weight of the user. Various weight supporting mechanisms may be provided.

In some embodiments, wheels are provided for free or restricted motion of the system, allowing the system to be used virtually anywhere.

In some embodiments, mechanisms may also be included to provide mechanical force to help the movement of users. These mechanisms may include attachment means to attach to the user's body and motorized units to provide the mechanical force. In some examples, motorized leg attachments may be provided to assist the natural walking gait of a user.

In some embodiments, the system may be modular, allowing various components to be removed and replaced with components with different sizes and specifications, depending on the needs of the users.

In some embodiments, the system may be adjustable. The system may be adjusted to fit users of different sizes. The force provided by the motorized units may be adjusted. The portion of the user's weight borne by the system may also be adjusted.

In some embodiments, a real-time control system is used to control the movement of varying number of motorized units and to provide adjustment of the mechanical force.

In some embodiments, a real-time control system is used with a long term artificial intelligence system to provide better and more optimal control of the device through suggestions to the end user, direct application of control parameters, visualisation of long term metrics, or any combination of these.

In some embodiments, an artificial intelligence based long-term learning system which combines different mobile systems sequence learning models to create a deep neural network for gait actions across different disabilities and users is provided.

In some embodiments, an artificial intelligence based settings recommender engine which uses reinforcement learning to improve recommendations for gait settings on the user interface based on a score assigned by the end user on their applicability over time and across different mobile systems is provided.

In some embodiments, an artificial intelligence based control engine which maps each motorized units joint data corresponding to position, velocity and torque and user profile data to a gait action such as turning through a sequence learning model such as a recurrent neural network model including a hidden layer which converts all motorized units joint data into different gait phases is provided.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

In various example embodiments, there is provided a mobile system for physiotherapy and mobility, suitable for improving users' ability to walk. The system may be sized differently, and the components may be adapted to best fit the characteristics of the users, for example, the weight, height, level of ability to walk, varying symmetry of limbs of the users.

FIGS. 2-9 illustrate example embodiments of the device.

Figure 1A:
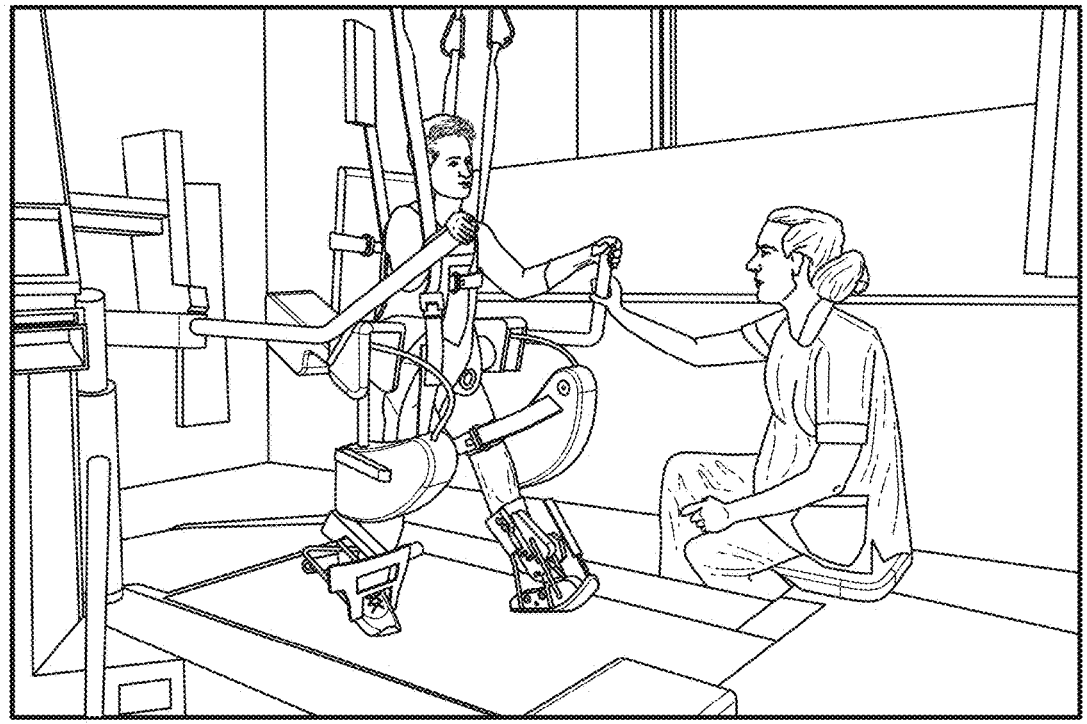
FIG. 1A shows a rehabilitation system by Lokomat™ in operation.
Figure 1B:
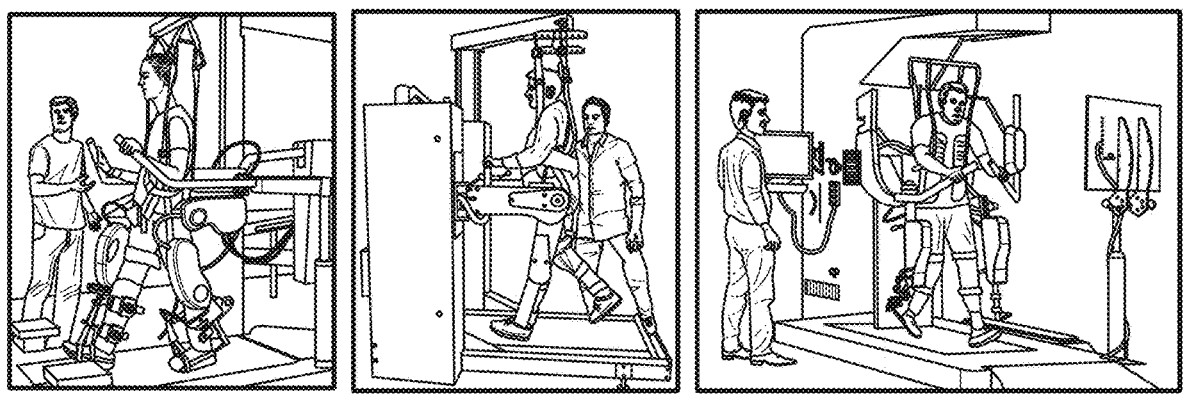
FIG. 1B shows rehabilitation systems from Lokomat™, ReoAmbulator™, and Bama Teknoloji, from left to right, respectively.
Figure 2:
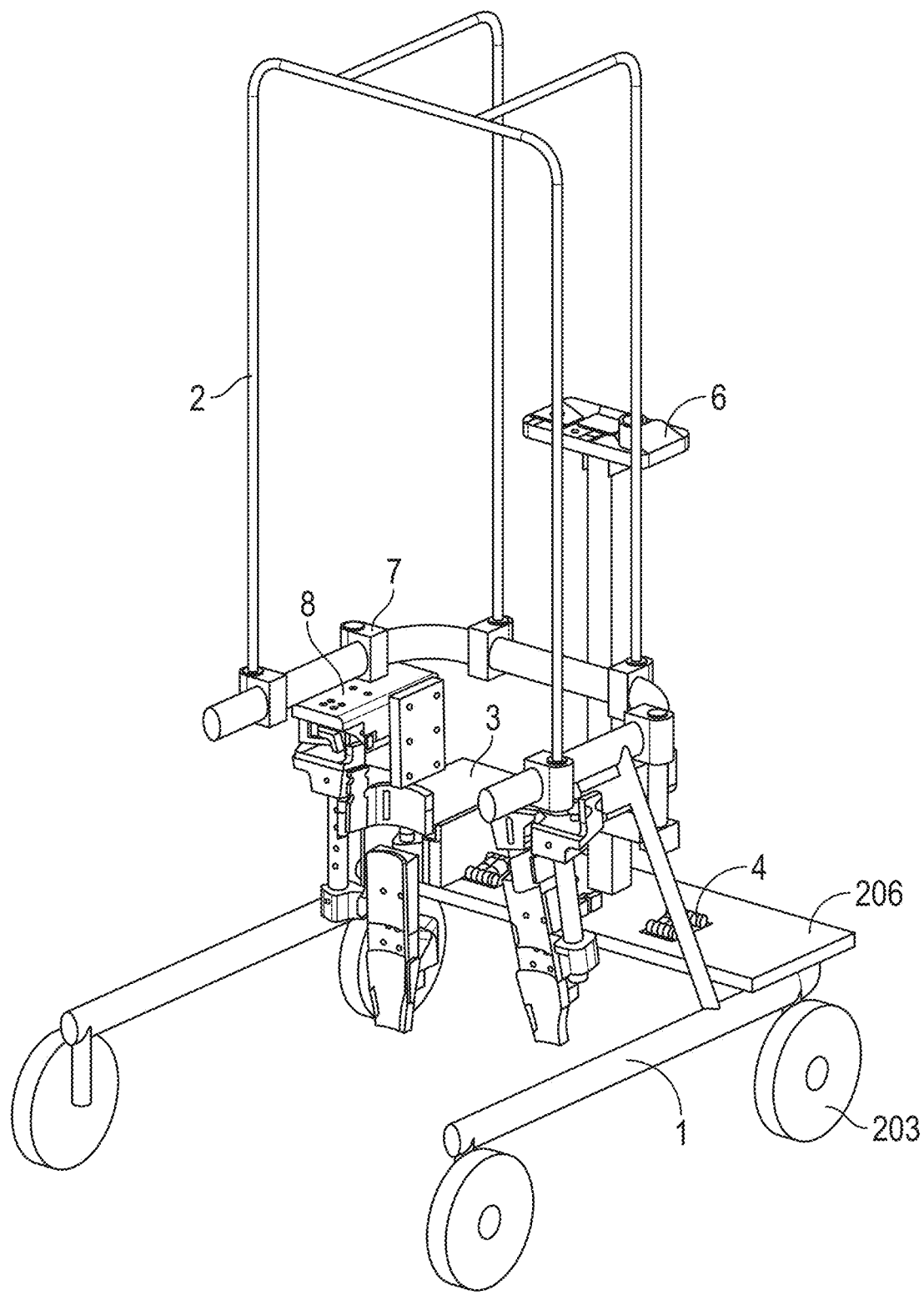
FIG. 2 shows a perspective view of one example embodiment of the device.

FIG. 2 is a perspective view of an assembled mobile system of the embodiment. The mobile system comprises an outer frame 1, a harness attachment frame 2, wheels 203, a platform 206, a power supply unit 3, a motor control unit MCU 4, a human machine interface 6, adjustable leg attachment braces 7 and leg attachments 8. The power supply unit 3, MCU 4 and human machine interface 6 are disposed on platform 206. In some example embodiments, the human machine interface 6 is raised from the platform 206 so that operators can easily use the human machine interface while standing or sitting.

It is understood that there may only be one adjustable leg attachment brace 7 and one leg attachment 8 if the other leg of the user does not need support.

In some embodiments, an acquisition unit AU not shown is configured in the mobile system. The acquisition unit may be used to gather all sensory data from the device on a regular basis.

Figure 3:
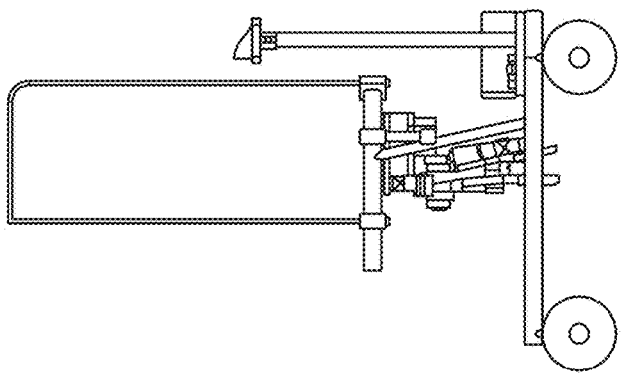
FIG. 3 shows the top view, front view and side views of the example embodiment.
Figure 3:
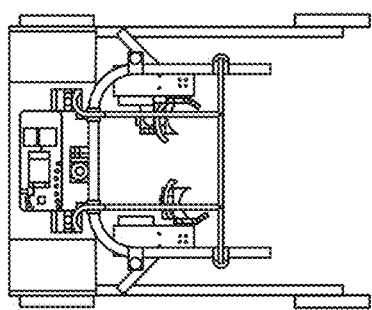
Figure 3:
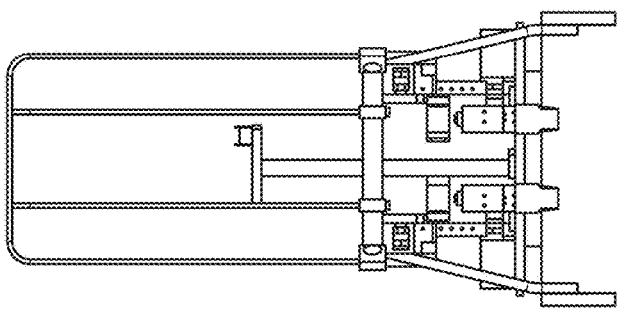
Figure 3:
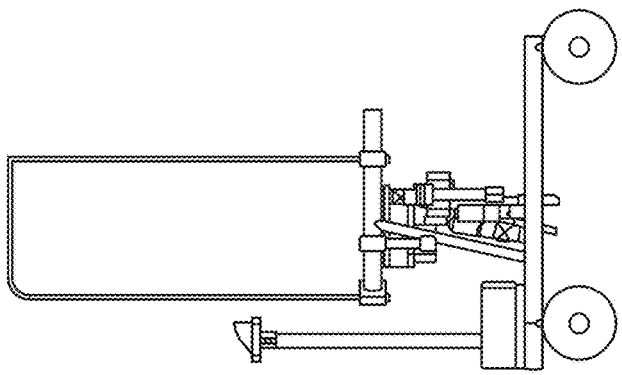

FIG. 3 shows the top view, front view and side views of the mobile system of the embodiment.

Figure 4:
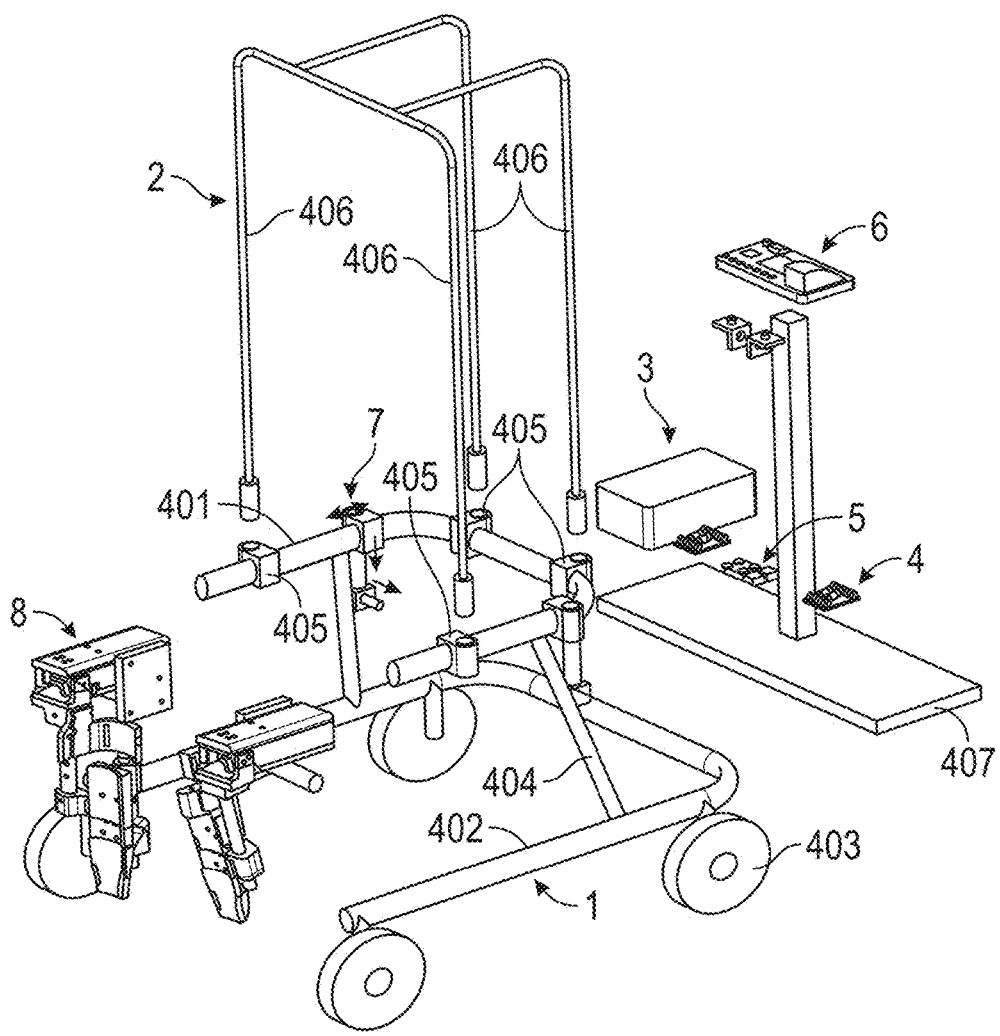
FIG. 4 shows an exploded view of an example embodiment of the device.

FIG. 4 shows an exploded view of the embodiment.

In this embodiment, the system comprises an outer frame 1. The outer frame 1 may be a rigid body that provides support to all other components of the system. The outer frame 1 may comprise a lower body 402 and an upper body 401. The lower body 402 and the upper body 401 may each be partially closed to allow a user to enter into the outer frame 1. In some embodiments, the lower body 402 may be rectangularly shaped with an opening on one side. In some embodiments, the lower body 402 may be circle-shaped or ellipse-shaped with an opening. In some embodiments, the upper body 401 may be rectangularly shaped with an opening on one side. In some embodiments, the lower body 402 may be circle- or ellipse-shaped with an opening. In some example embodiments, the opening in the upper body 401 aligns with the opening in the lower body 402. The lower body 402 and the upper body 401 are connected by any suitable means known in the field. In some examples, as shown in FIG. 4, the lower body 402 and the upper body 401 are connected by rods 404. It is understood that the shapes and length of the rods may be changed to suit the characteristics of different users. In some example embodiments, the lower body 402 and the upper are concentric. In some example embodiment, the lower body 402 encloses a bigger area than the upper body 401, making it less likely for the outer frame 1 to tip over. It is understood that the outer frame 1 may be configured in any suitable way known in the field to provide stability, to prevent tip over and to provide support.

In some embodiments, the outer frame 1 is configured with wheels 403 to facilitate movement of the system. In some example embodiments, four wheels 403 are configured on the bottom of the outer frame 1. The wheels 403 are, for example, attached to the lower body 402 of the outer frame 1. The wheels 403 may be attached to the lower body 402 by any suitable means known in the field. In some embodiments, the wheels 403 may be configured to allow constrained motion, for example, in a particular axis. In some embodiments, the wheels 403 may be configured to allow rotation. Brakes may be provided on the wheels 403 to keep the system stationary.

In some examples, the upper body 401 is configured at a height suitable for a user to rest her hands on to support her upper body 401. In some examples, the upper body 401 may be configured at a height suitable for a user to lean on. In some embodiments, the height of the upper body 401 may be adjustable.

In some embodiments, the upper body 401 is configured with receptacles 405 to receive the bottom of harness attachment frame 2 so that harness attachment frame 2 can be attached to the outer frame 1. The receptacles 405 may be attached to the upper body 401 by any suitable means known in the field. For example, a receptacle 405 may be configured with a clamping mechanism to clamp onto the upper body 401. In some embodiments, harness attachment frame 2 may comprises several substantially vertical rods 406 that are connected to each other in the top portion of harness attachment frame 2. The receptacles 405 may be configured with a recessed opening to receive a part of the bottom portion of the rods 406. It is understood that the cross section of a rod 406 may be rectangular, circular, elliptical or any other suitable shape. In some embodiments, the top of harness attachment frame 2 may be higher than the user's head or shoulder. The top of the harness attachment frame 2 can include at least one horizontal cross-frame member which can be used to provide maximum, e.g., vertical load support of the harness straps. In some embodiments, the top of harness attachment frame 2 may be level with or lower than the armpit of the user. In example embodiments, the harness attachment frame 2 may be adjustable in height.

Figure 5:
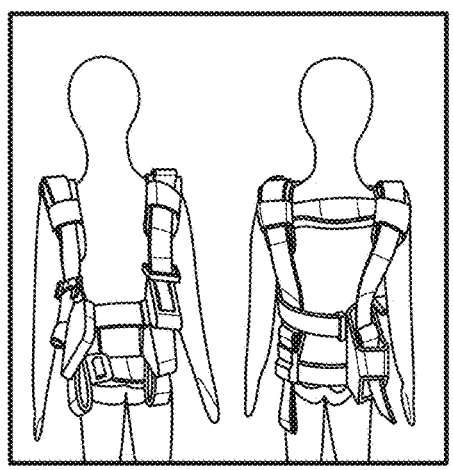
FIG. 5 shows some examples of harnesses for the device.
Figure 5:
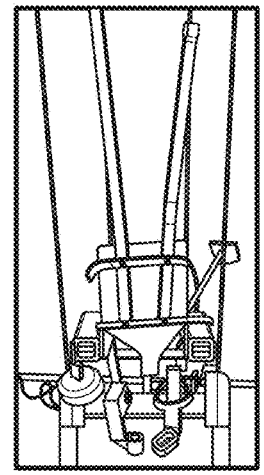
Figure 5:

In some embodiments, attachment points are provided on harness attachment frame 2 for attaching harness onto. Some examples of harnesses are shown in FIG. 5. It is understood configurations of harnesses other than those shown in FIG. 5 may also be used where suitable.

In some example embodiments, the harnesses are torso supporting harnesses. Such a harness can be strapped from below the pelvis and can provide support to the full upper body. The attachment points may be adjustable to best suit a user's need. The harness may be configured to support full or partial weight of the user as desired, while transferring the weight to harness attachment frame 2. In some embodiments, the amount of support may be adjusted by changing the height of the harness attachment frame 2. The harness may also be configured to lift the user partially off the ground to allow movement of the system. It is understood that the attachment points may be moved as desired by the user or a caregiver.

Figure 6:
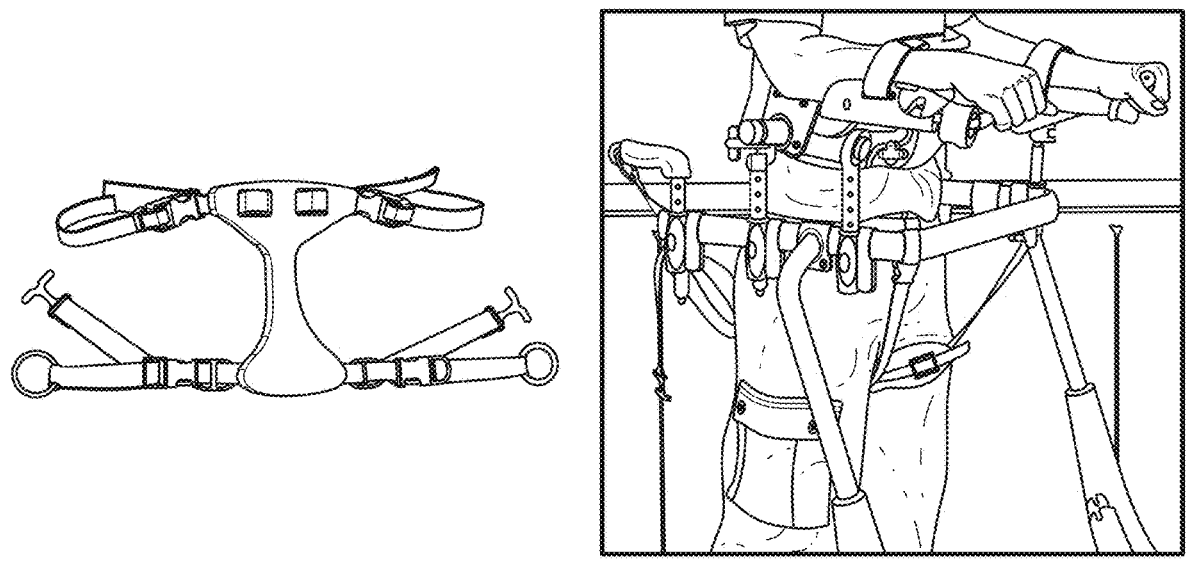
FIG. 6 shows some examples of pelvis supporting attachment for the device.

In some embodiments, a pelvis supporting attachment may be attached to outer frame 1. This attachment can be used to lift the user from below the pelvis area. Some examples of the pelvis supporting attachments are shown in FIG. 6. In some example embodiments, the pelvis support may be a saddle, as can be seen in FIG. 6. Since the saddle only supports the lower torso, note that when support of the upper torso is required, the harness can alternatively be used. It is understood that configurations of pelvis supporting attachment other than those shown in FIG. 6 may also be used where suitable.

In some embodiments, the harness and/or the pelvis supporting attachment comprise elastic components to allow variable level of weight bearing capabilities depending on the needs of the user. In some examples, the elastic components may be springs. In some examples, the elastic components may be elastic bands. In some examples, the elasticity of the elastic components may be changed to change the level of support provided to the user.

In some example embodiments, various other attachments may be used alone or in conjunction with the harness and/or the pelvis supporting attachment to further support the rest of the body. In some examples, a chest attachment may be used to keep the upper body from swaying during walking. In some embodiments, arm attachments may be used to allow the user to hold onto the outer frame during use.

It is understood that the height, size, construction and material of the harness, the pelvis supporting attachment and the other attachments may be adjusted to provide varied level of support as desired. Adjustment mechanisms may be provided on the harness, the pelvis supporting attachment and the other attachments to change the level of support as well.

In some embodiments, the mobile system may comprise an adjustable leg attachment brace 7. In some embodiments, the adjustable leg attachment brace 7 is attached to the upper body 401. Any suitable attachment means may be used for attaching the adjustable leg attachment brace 7 to the upper body 401.

In example embodiments, the adjustable leg attachment brace 7 is removably attached to the upper body 401 so that the attachment means may be loosened to allow the adjustable leg attachment brace 7 to move along the upper body 401. In some examples, a clamping mechanism is provided in the adjustable leg attachment brace 7 to clamp onto the upper body 401. Mechanisms may also be provided so that the adjustable leg attachment brace 7 may move upwardly or downwardly, and move toward or away from the centre of the upper body. In example embodiments, the leg attachment brace may have three degrees of freedom, allowing the leg attachment to move in the x, y and z direction, as shown by the arrows in FIG. 4. It is understood that the adjustable leg attachment brace 7 may be configured to move in other ways. For example, the adjustable leg attachment brace 7 may be configured to move in five or more axes as commonly known in the field of Computer Numeric Control. In some embodiments, movements in one or more of the directions may be actuated.

By movement of the adjustable leg attachment brace 7, the system may be fitted to users with different waist and overall width.

In some embodiments, the mobile system may also comprise one or two leg attachment 8, each leg attachment 8 attaching to one leg of the user. In example embodiments, each leg attachment 8 is attached to an adjustable leg attachment brace 7, so that the leg attachment 8 may be moved to a position that best fit the user's leg.

In some embodiments, the leg attachment 8 is attached to a user's leg. In some examples, the user's leg is strapped onto the leg attachment via multiple straps around the thigh and the calf.

In some embodiments, sensory units may be attached onto the user's leg to detect the movement of the leg. The detection may be transmitted to the SBC 5 to predict the user's intended movement the movement of the leg attachment 8 may be adjusted accordingly.

In some embodiments, a power supply unit 3, a human machine interface 6, a MCU 4, and a single board computer SBC 5 are also provided. An AU may also be provided.

The power supply unit 3 provides power to the human machine interface 6, the MCU 4, the SBC 5, and the leg attachment 8. A battery may be integrated in the power supply unit 3. Alternatively or additionally, the power supply unit 3 may be plugged into the wall to convert AC power to DC power to provide power and/or charge the battery.

The SBC 5 is the main control unit of the system. The SBC 5 may be used to ensure communication between the MCU and the AU. It may also be configured to store and execute main program loop and controlling all auxiliary systems. In some embodiments, the SBC 5 is also used for communication with a server.

The human machine interface 6 is used for communicating with the user or the user's helper. The human machine interface 6 may comprise a display for showing information, comprising a graphical user interface. The human machine interface 6 may also comprise an input device for the user or the user's helper to enter information. The input device may be buttons, a keyboard or a touchscreen. The information entered through the human machine interface 6 may be transmitted to SBC 5.

In some embodiments, there is provided a platform 407, which may be disposed on the lower body 402 of the outer frame 1. One embodiment is shown in FIG. 4. In some embodiments, the power supply unit 3, the human machine interface 6, the MCU 4, the AU, and the SBC 5 are disposed on the platform 407. In example embodiments, the human machine interface 6 is raised so that an operator can use it more conveniently.

Figure 7:
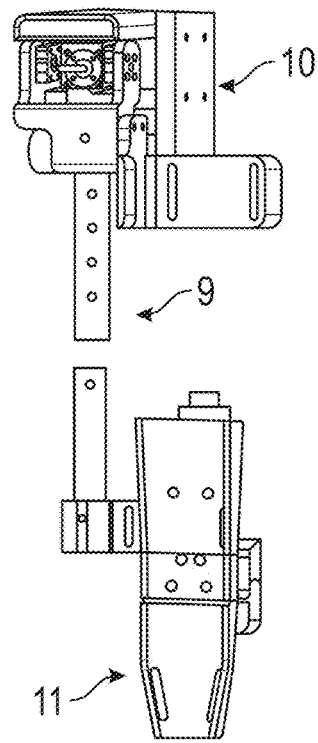
FIG. 7 shows an exploded view of an example embodiment of the leg attachment for the device.

FIG. 7 shows an exploded view of one embodiment of the leg attachment 8. The leg attachment 8 comprises an adjustable thigh 9, a hip joint 10 and a knee joint 11. In example embodiments, the leg attachment 8 can be attached to a part of the lower body of the user, or a for example at least at the waist or below.

The hip joint 10 is designed to assist moving the user's hip joint. The upper end of the hip joint 10 is attached to the adjustable leg attachment brace 7, while the lower end is attached to the adjustable thigh 9.

The adjustable thigh 9 is designed to allow for a variable distance between the hip joint 10 and the knee joint 11. In some embodiments, this is implemented via a telescopic mechanism. In some examples, a button and click mechanism is used. In some examples, a slide and clamp mechanism is used.

The knee joint 11 is designed to assist moving the user's knee joint. The upper end of the knee joint 11 is attached to the adjustable thigh 9. The lower end of the knee joint is free, with the option to attach onto the user's leg via the calf or at a lower point near the ankle.

In operation, the position of the hip joint 10 may be changed by adjusting the adjustable leg attachment brace 7 so that the hip joint 10 may best support and help move a user's hip joint. By adjusting the adjustable thigh 9, the position of the knee joint 11 may be changed relative to the hip joint 10 to best support and help move to a user's leg.

Figure 8:
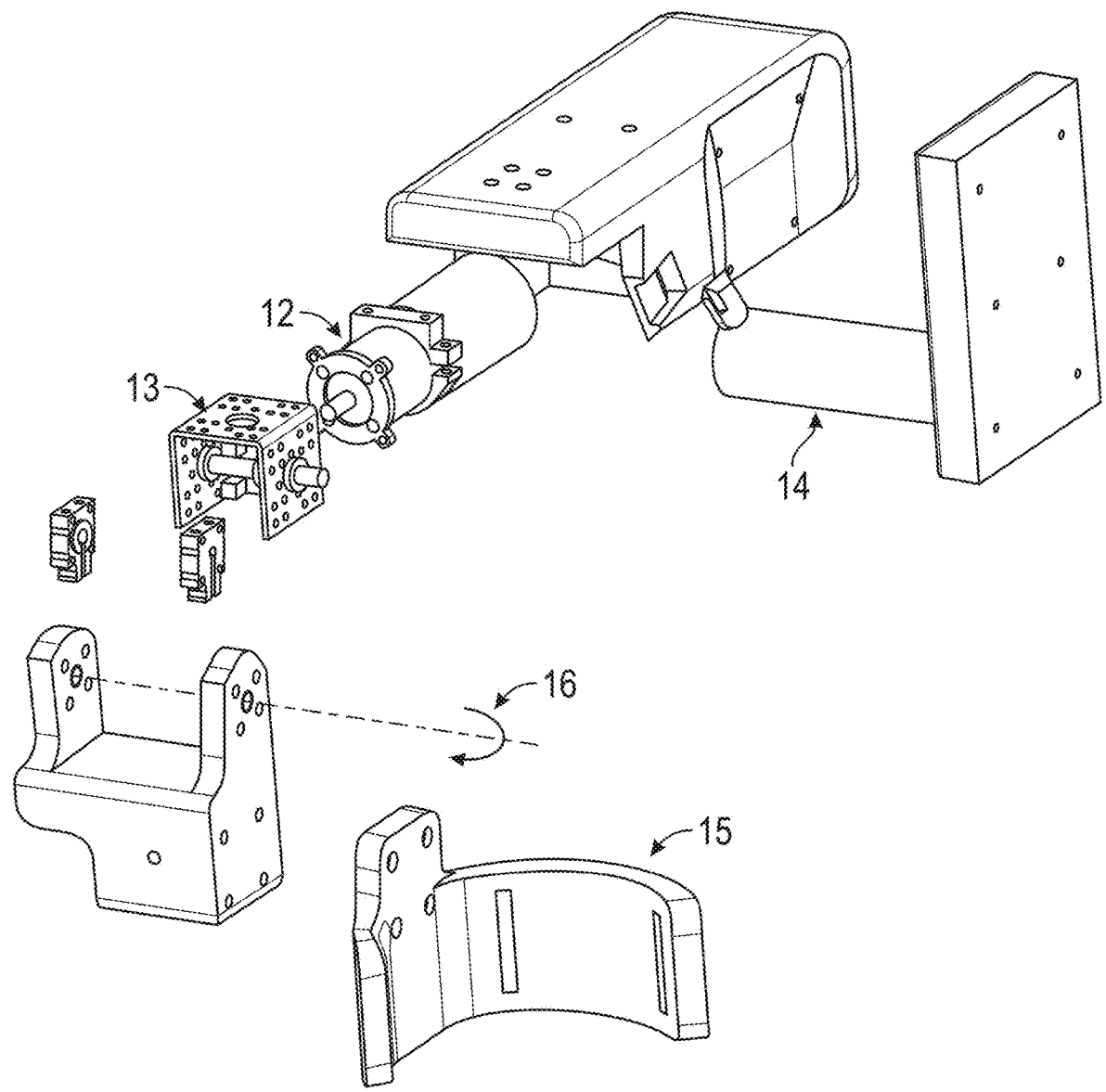
FIG. 8 shows an exploded view of one example embodiment of a hip joint.

FIG. 8 shows an exploded view of the hip joint 10, comprising a hip actuator 12, a gearbox 13, a limit switch 14, and a thigh/hip attachment 15.

The hip actuator 12 may be a rotary actuator or a linear actuator. In some embodiments, the hip actuator may comprise an encoder, a potentiometer or a similar feedback device to receive rotational or positional feedback. The feedback signal may be fed back into the MCU 4, the AU, or the SBC 5. The hip actuator 12 may be placed horizontally within a casing as shown in FIG. 8, or it may be placed vertically. The hip actuator 12 may be powered by the power supply unit 3, which transmits electrical/hydraulic energy.

In some embodiments, the hip actuator 12 may be configured as a compliant actuator. A compliant actuator allows some motion or deviation from its own equilibrium position. In some embodiments, a compliant actuator may have an elastic component attached to the linear or rotary actuator. In example embodiments, the elastic component is a spring-like structure.

In some embodiments, the hip actuator 12 may be configured to drive the hip joint 10 and the knee joint 11 through a kinematic linkage.

In some embodiments, a single hip actuator 12 may be configured to drive the hip joint 10 on both legs.

The gearbox 13 is designed to convert the rotary or linear motion from the actuator into precise rotational motion along the hip flexion extension axis 16. The gearbox may be of any suitable gear ratio. The gear may be selected from mitre gears, worm gears, bevel gears, bevel helical gears or specialized harmonic gears.

In some embodiments, the hip joint 10 may comprise a limit switch 14. The limit switch 14 may be used to calibrate the movement of the hip joint, and to notify the software that the joint has reached the maximum point in its gait as limited mechanically. The signal from the limit switch 14 may be sent to the MCU, AU and/or SBC.

In some embodiments, the hip joint 10 further comprises a thigh/hip attachment 15 to connect the user's leg to the mobile system. In some examples, the thigh/hip attachment 15 may be attached to a user's leg using a strap-like system.

In operation, the movement of the hip actuator 12 may be controlled by the MCU, depending on parameters entered through the human machine interface 6. For example, the movement of the hip actuator 12 may be adjusted depending on the height and weight of the user, taking into account the user's own ability to walk. The movement of the hip actuator 12 may be adjusted based on the signal from the limit switch 14.

Figure 9:
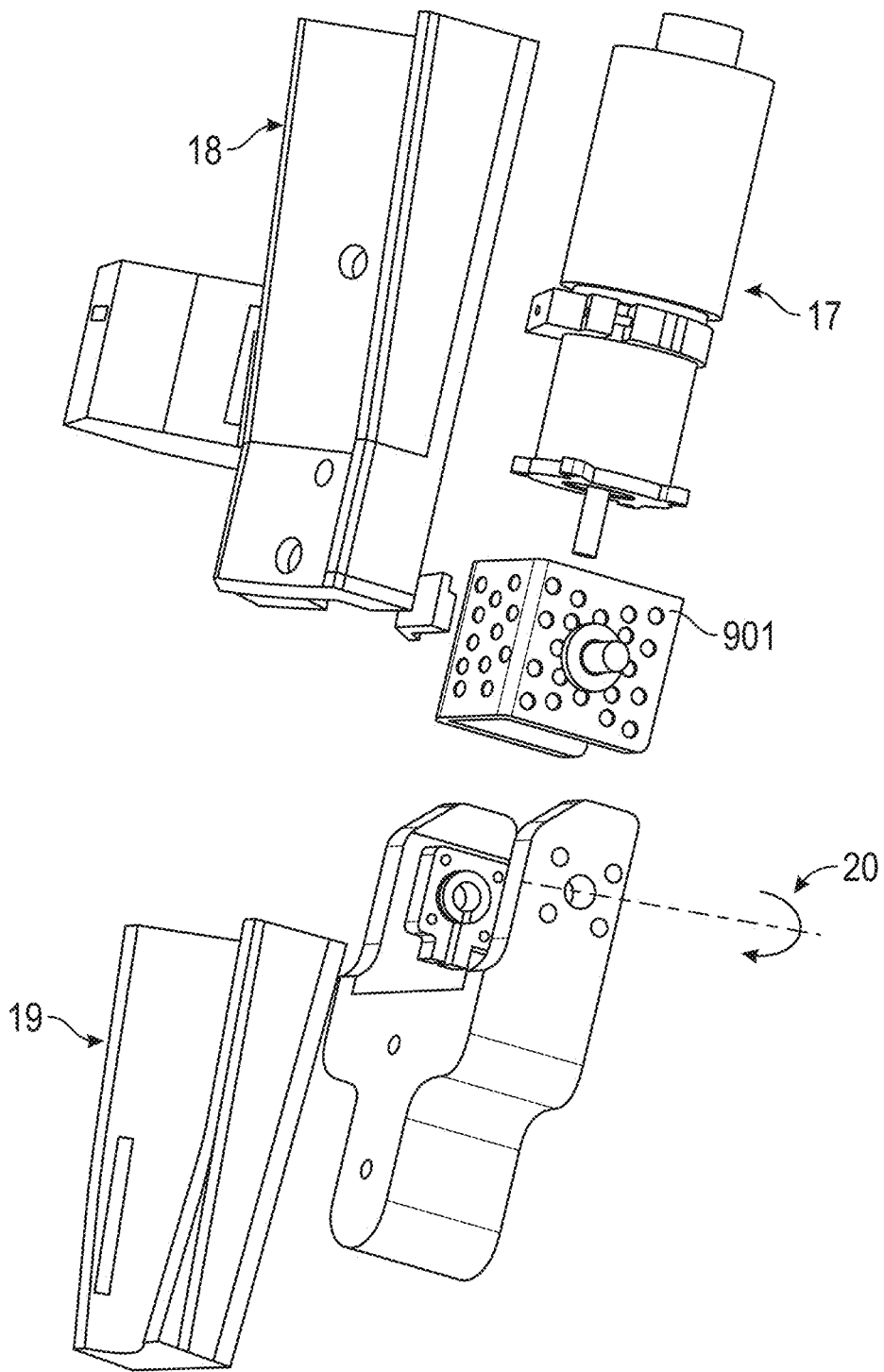
FIG. 9 shows an exploded view of one example embodiment of a knee joint.

FIG. 9 shows an exploded view of the knee joint 11, comprising knee actuator 17, thigh attachment 18 and calf attachment 19.

The knee actuator 17 may be a rotary or linear actuator. In some examples, the gearbox 901 may convert the linear motion output of the linear actuator to a rotary motion. In some examples, a lever arm mechanism may be provided to convert the linear motion output from a linear actuator to a rotary motion. The rotary motion is around the knee flexion extension axis 20. The knee actuator 17 may be placed behind the user's leg or on the side of the leg. In some embodiments, the knee actuator 17 may comprise a compliant actuator. The knee actuator 17 may be powered by the power supply unit 3, which transmits electrical/hydraulic energy.

In some embodiments, the knee actuator 17 may be used to drive the knee joint 11 and hip joint 10 through a kinematic linkage.

In some embodiments, a single knee actuator 17 may be configured to drive the knee joint 11 on both legs.

The gearbox 901 is designed to convert the rotary or linear motion from the actuator into precise rotational motion along the knee flexion extension axis 20. The gearbox may be of any suitable gear ratio. The gear may be selected from mitre gears, bevel gears, worm gears, bevel helical gears or specialized harmonic gears.

The thigh attachment 18 is used to provide a point of contact and union with the user's thigh. In some embodiments, a strap like mechanism is provided to attach the thigh attachment 18 to the user's thigh. The upper end of the thigh attachment 18 is attached to the adjustable thigh 9.

The calf attachment 19 is used to provide another point of contact and union with the user's leg. The calf attachment 19 may be attached to a user's calf by any suitable means known in the field. In some embodiments, a strap like mechanism may be used. The calf attachment may be connected to the drive mechanism via an auxiliary attachment.

In operation, the movement of the knee actuator 17 may be controlled by the MCU or the SBC, depending on parameters entered through the human machine interface 6. For example, the movement of the knee actuator 17 may be adjusted depending on the length and girth of the user's thigh, taking into account the user's own ability to walk.

In a similar fashion, an ankle joint may be configured using the similar drive mechanism and implementation.

Figure 10:
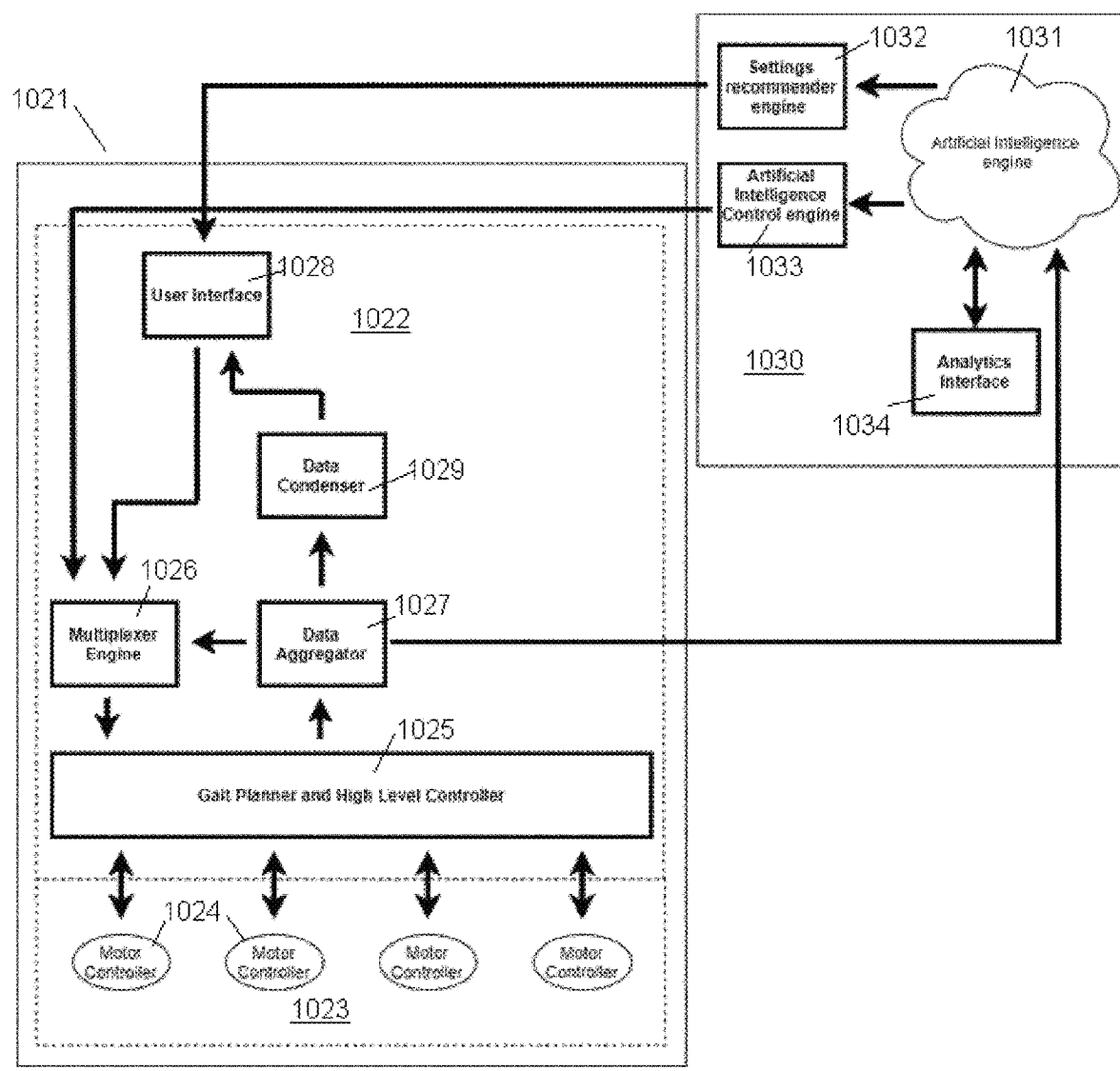
FIG. 10 shows a block diagram of the interaction between the various organised software units, software modules, engines and interfaces for the control, data logging and artificial intelligence of the mobile system of the embodiment.

FIG. 10 shows a block diagram of the interaction between the various software modules, engines and interfaces for the control, data logging/interpretation and artificial intelligence of the mobile system. This organization of organized software units such as 1022, or software modules such as 1028, engines such as 1032 and interfaces between these allow for implementing control of the device, learning of functions from the data with artificial intelligence and a priori knowledge and passing data streams effectively within learning, planning and interfacing organized unit 1022, direct control unit 1023, long term learning, analytics and recommendation unit 1030; and the modules and engines within these organized units. The artificial intelligence for controlling the function of the mobile system can be local and/or cloud-based in example embodiments. The artificial intelligence comprises at least one processor and memory. In an example embodiment, the artificial intelligence further comprises a communication subsystem configured to provide communication functions, e.g. access the Internet, server data, and/or cloud data.

The mobile system organized unit 1021 encompasses the online learning, planning and interfacing organized unit 1022 and the direct control organized unit 1023.

The direct control organized unit 1023 encompasses multiple motor controllers 1024 which can be the same or different in terms of sensors, power drive systems, motor drive systems, controller hardware and actuators. This unit handles the lowest level of control with direct control of the actuator and real-time sensing through the interfaces provided by the motor controllers 1024. The direct control unit 1023 has an interface to the online learning, planning and interfacing unit 1022 abstracting away the lowest level of control. The interface also provides real-time sensor data streams.

In certain embodiments, the direct control organized unit 1023 can be used with different motor controllers 1024 which can control different types of actuators while still providing the same interface to the learning, planning and interfacing unit 1022 thereby allowing flexibility in controlling different types of mobile systems.

The learning, planning and interfacing organized unit 1022 encompasses the user interface 1028, data condenser 1029, data aggregator 1027, multiplexer engine 1026, gait planner and high-level controller 1025. This unit handles the higher-level planning, control, learning and user interface resources.

The gait planner and high-level controller 1025 may comprise a system based on internal capabilities to generate trajectories to apply to individual motor controllers 1024 through the direct control unit 1023.

In certain embodiments, the gait planner and high-level controller 1025 may provide a means to learn various functions of different gaits and controllers related to the rehabilitation and mobility aspects of the system from the data streams of real-time sensing provided by the direct control organized unit 1023 and user inputs from the user interface 1028. These functions, called online learned functions, can be passed onto the data aggregator 1027 which in turn pass it to the long-term learning, analytics and recommendation organized unit 1030 or the data condenser 1029 which can further pass it on to the user interface 1028 after carrying out certain types of filtering. An example of a few learned functions can be user turning mobile system model, controller for the user turning in the mobile system model, user walking up a ramp mobile system model, controller for the user walking up a ramp in the mobile system model.

In certain embodiments, the learned functions may be directly used in generating trajectories to apply to individual motor controllers 1024 through the direct control organized unit 1023. An example would be to the use the user turning mobile system model and user mobile system model controller functions to directly control the individual motor controllers 1024 to carry out the turning maneuver through the direct control organized unit 1023.

In certain embodiments, the learned functions from one user and mobile system can be used with another user and mobile system in some combination.

In certain embodiments, the gait planner and high-level controller 1025 may use functions generated by the multiplexer engine 1026 to generate trajectories to apply to individual motor controllers 1024 through the direct control organized unit 1023.

In certain embodiments, the gait planner and high-level controller 1025 may use any combination of the multiplexer engine 1026, learned functions and internal capabilities to generate trajectories to apply to individual motor controllers 1024 through the direct control organized unit 1023.

The data aggregator 1027 may be used to accumulate data streams from the gait planner and high-level controller 1025 and further pass this on to the artificial intelligence engine 1031 which resides in the long-term learning, analytics and recommendation organized unit 1030.

In some embodiments, the data aggregator 1027 may store the accumulated data for different periods of times.

In some embodiments, the data aggregator 1027 may pass data to the multiplexer engine 1026.

In some embodiments, the data aggregator 1027 may operate in any combination of transferring data to the artificial intelligence engine 1031, storing accumulated data, and passing data onto the multiplexer engine 1026.

The data condenser 1029 may be used to filter, analyse and accumulate data received from the data aggregator 1027 in any possible combination.

The user interface 1028 may be used to provide data related to adjustments to settings to an end user by using the data from the data condenser 1029. An example could be data which suggests changing the force support setting on a particular joint to improve performance. It may also be used to provide data to the multiplexer engine 1026 such as tweaks to control parameters to have more optimal control of the device. The user interface 1028 may also provide data to professionals, for example, physiotherapist, to change the settings on the device by providing some insight into what should be changed and by how much based on previous learned models and results from the long-term learning, analytics and recommendation unit 1030.

In some embodiments, the user interface 1028 may receive data from the settings recommended engine 1032 which is part of the long-term learning, analytics and recommendation organized unit 1030. This data may be used to recommend changes to settings which are passed on to the multiplexer engine 1026 which may then make better decisions and improve the overall performance of the device and its use.

The multiplexer engine 1026 may be used in any possible combination to combine data from the data aggregator 1029, user interface 1028 and the artificial intelligence control engine 1033 to provide data to the gait planner and high-level controller 1025.

In some embodiments, the multiplexer engine 1026 may create learning functions with the long-term and short-term goals from the artificial intelligence control engine 1033. These learning functions can be used to create better optimal control parameters for the gait planner and high-level controller 1025. In an example embodiment, the artificial intelligence control engine 1033 implements one or more neural networks.

The long-term learning, analytics and recommendation organized unit 1030 comprises the settings recommender engine 1032, artificial intelligence control engine 1033, analytics interface 1034, and artificial intelligence engine 1031. The long-term learning, analytics and recommendation organized unit 1030 may be used to carry out automatic or cooperative (with assistance from an expert) model generation for various activities such as walking, running to name a few.

In some cases, the long-term learning, analytics and recommendation organized unit 1030 may function as an expert system comprising medical expertise providing functions similar to a physiotherapists and clinicians specialised in gait rehabilitation and/or mobility, controls expertise similar to a controls engineers highly trained in the design and tuning of adaptable controls systems for powered orthosis devices and data scientists with expertise in inferring the most critical and useful metrics for clinicians and physiotherapist through various data streams in the context of rehabilitation and/or mobility.

The artificial intelligence engine 1031 may be used to provide data to the settings recommender engine 1032, artificial intelligence control engine 1033, and analytics interface 1034. This data may be inferred through learning functions which apply artificial intelligence on data provided by the data aggregator 1027.

In some embodiments, the artificial intelligence engine 1031 may use data gathered from numerous mobile system devices to create better models and learned functions using artificial intelligence. These models and learned functions will evolve as more mobile system devices are used and existing mobile system devices are used more frequently allowing for a continuous improvement in data provided to the settings recommender engine 1032, artificial intelligence control engine 1033, and analytics interface 1034 which can be used to provide better performance overall.

The settings recommender engine 1032 may be used to provide suggestions to the user interface 1028 based on data from the artificial intelligence engine 1031. These suggestions may be used to decide on better settings which may be used to provide a better user experience, improve performance and better use the mobile system.

In some embodiments, the settings recommender engine 1032 may be thought of numerous physiotherapist and clinicians combining their knowledge on what the most optimal settings should be to achieve the individual end user's goals.

The artificial intelligence control engine 1033 may be used to provide better long-term and short-term goals to the multiplexer engine 1026. An example of a long-term goal is the overall distance to be covered using the mobile system device in a fixed session time. An example of a short-term goal is the average speed to maintain in the next 10 gait cycles. The short-term goal can also be used to help achieve the long-term goal as in the example outlined above.

The analytics interface 1034 may be used to provide useful learned metrics to let the end user analyse how the sessions with the mobile system device are progressing and change settings on the mobile system device to improve future sessions. This may be used to learn about progress of different end users over multiple sessions and how changes to the mobile system device in terms of various settings have affected the outcome of the session. By tracking these metrics over time end users can have quantifiable data to show their progression using the device.

In some embodiments, these metrics can span multiple dimensions and relate to various parameters such as force on limb over the gait phase over multiple sessions. This high dimensional data can also be reduced to lower dimensions for easier understanding using the artificial intelligence engine 1031.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the example embodiments, such variations being within the intended scope of the present disclosure. In particular, features from one or more of the above-described embodiments may be selected to create alternative embodiments comprised of a sub-combination of features, which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

Certain adaptations and modifications of the described embodiments can be made. Therefore, the above discussed embodiments are considered to be illustrative and not restrictive.

What is claimed is:

1. A system for rehabilitation and/or mobility of a user, comprising:
a hollow frame, comprising an inter-connected lower body and upper body, wherein the upper body comprises a first arm and second arm extending from an interconnecting frame portion of the upper body, the upper body being positioned below the elbows of the user during operation of the system, and wherein the lower body comprises a first arm and a second arm extending from an interconnecting frame portion of the lower body;
wheels, attached to the lower body of the hollow frame for rolling movement;
a pelvis support, modularly attached to the hollow frame for distributing at least partial weight of the user to the hollow frame, wherein a weight bearing portion of the pelvis support is positioned between a pair of legs of the user during operation of the system;
a motorized leg attachment for each leg, each operably attached to the hollow frame, each comprising an attachment for attaching to a leg of the user, and each configured to apply mechanical force to the leg for assisting the natural walking gait of the user, each motorized leg attachment further comprising:
a knee joint for assisting movement of the user's knee joint, the knee joint comprising a calf attachment, a knee actuator, a first gearbox connected to the knee actuator, the first gearbox configured to convert a motion from the knee actuator into to a rotational motion about a knee flexion extension axis, and
a hip joint for assisting movement of the user's hip joint, the hip joint comprising a thigh attachment, a hip actuator, a second gearbox connected to the hip actuator, the second gearbox configured to convert a motion from the hip actuator into rotational motion about a hip flexion extension axis, wherein the knee actuator and the hip actuator are both configured to drive the hip joint and the knee joint through a kinematic linkage, wherein the knee joint is attached to the hip joint via an adjustment mechanism to the hip joint, the adjustment mechanism configured to adjust a distance between the knee joint and the hip joint, and wherein the hip joint is attached to the upper body of the frame;
a first plurality of sensory units for attaching to the legs of the user and a second plurality of sensory units for attaching to the hollow frame, both the first plurality of sensory units and the second plurality of sensory units being configured in combination to detect intended movements of the legs of the user as a particular gait of the user;
a platform, attached to the hollow frame, comprising a motor control unit (MCU), a single board computer (SBC) for providing instructions to the MCU, and a raised human machine interface operable by the user while standing or sitting, the human machine interface comprising at least a display for showing information and an input device for entering information to adjust control parameters of the MCU via the SBC, wherein the movement of the hip actuator and the movement of the knee actuator are both controlled by one or both of the MCU and the SBC; and an artificial intelligence based control system for controlling each motorized leg attachment and providing adjustment of the mechanical force applied to each leg to adjust a gait action of each motorized leg attachment based on the intended movements of the legs of the user, the artificial intelligence based control system comprising at least one processor and memory, wherein the artificial intelligence based control system comprises:
- an artificial intelligence based long-term learning system which combines a plurality of sequence learning models to create a deep neural network for customizing the gait action based on at least a disability and user profile data,
- an artificial intelligence based settings recommender engine for using reinforcement learning to improve recommendations for gait settings based on a score assigned by the user, the gait settings determining a plurality of gait trajectories to apply for each of the motorized leg attachments via the mechanical force applied to each leg, and
- an artificial intelligence based control engine which is configured to convert joint data from each motorized leg attachment into different gait phases based on the gait settings and user profile data.

2. The system of claim 1, wherein the upper body and lower body are closed on three sides and open on one side, and the upper body and the lower body are connected via a connecting rod.

3. The system of claim 1, wherein the lower body encloses a first area that is equal to or larger than a second area enclosed by the upper body.

4. The system of claim 1, wherein the upper body includes a plurality of arm attachments for attaching each arm of the user to the upper body in a resting, substantially horizontal position.

5. The system of claim 1, wherein each motorized leg attachment is configured to only assist movement of the respective leg of the user that it is attached to, and not to assist movement of other body parts of the user.

6. The system of claim 1, wherein the pelvis support is a saddle.

7. The system of claim 1, wherein the pelvis support is a harness.

8. The system of claim 7, wherein the hollow frame comprises a height-adjustable upper frame having at least one harness attachment point and a cross bar that is higher than the shoulder or head of the user, wherein the harness is attached to the upper frame at the at least one harness attachment point.

9. The system of claim 8, wherein the pelvis support is of a length to lift the user partially off the ground.

10. The system of claim 1, wherein each motorized leg attachment is movably attached to different parts on the frame and is configured to drive the wheels.

11. The system of claim 1, wherein the attachment for each motorized leg attachment comprises one or more of a leg attachment, thigh attachment, knee attachment, hip attachment, calf attachment, and ankle attachment.

12. The system of claim 1, wherein the artificial intelligence based control engine comprises a recurrent neural network model including a hidden layer for converting each motorized leg attachment's joint data into different gait phases.

13. The system of claim 1, wherein the artificial intelligence based control system learns based at least in part on real-time sensing, the artificial intelligence based control system learning a plurality of different models corresponding to different types of ambulation.

14. The system of claim 1, wherein the lower body comprises a u-shaped lower frame and the upper body comprises a u-shaped upper frame, wherein the u-shaped lower frame is sized larger than the u-shaped upper-frame, and wherein the lower body is positioned horizontally to the upper body.

15. The system of claim 1, further comprising an arm brace assembly, the arm brace assembly being affixed to the upper body, the arm brace assembly comprising a handle.

16. The system of claim 1, wherein the lower body is sized larger than the upper body, and the lower body encloses a bigger area than the upper body.

17. The system of claim 1, wherein the pelvis support comprises a saddle.

18. The system of claim 1, wherein the hip joint comprises a limit switch that produces a signal indicating a point in a gait of the hip joint.

* * * * *